Figure 1:
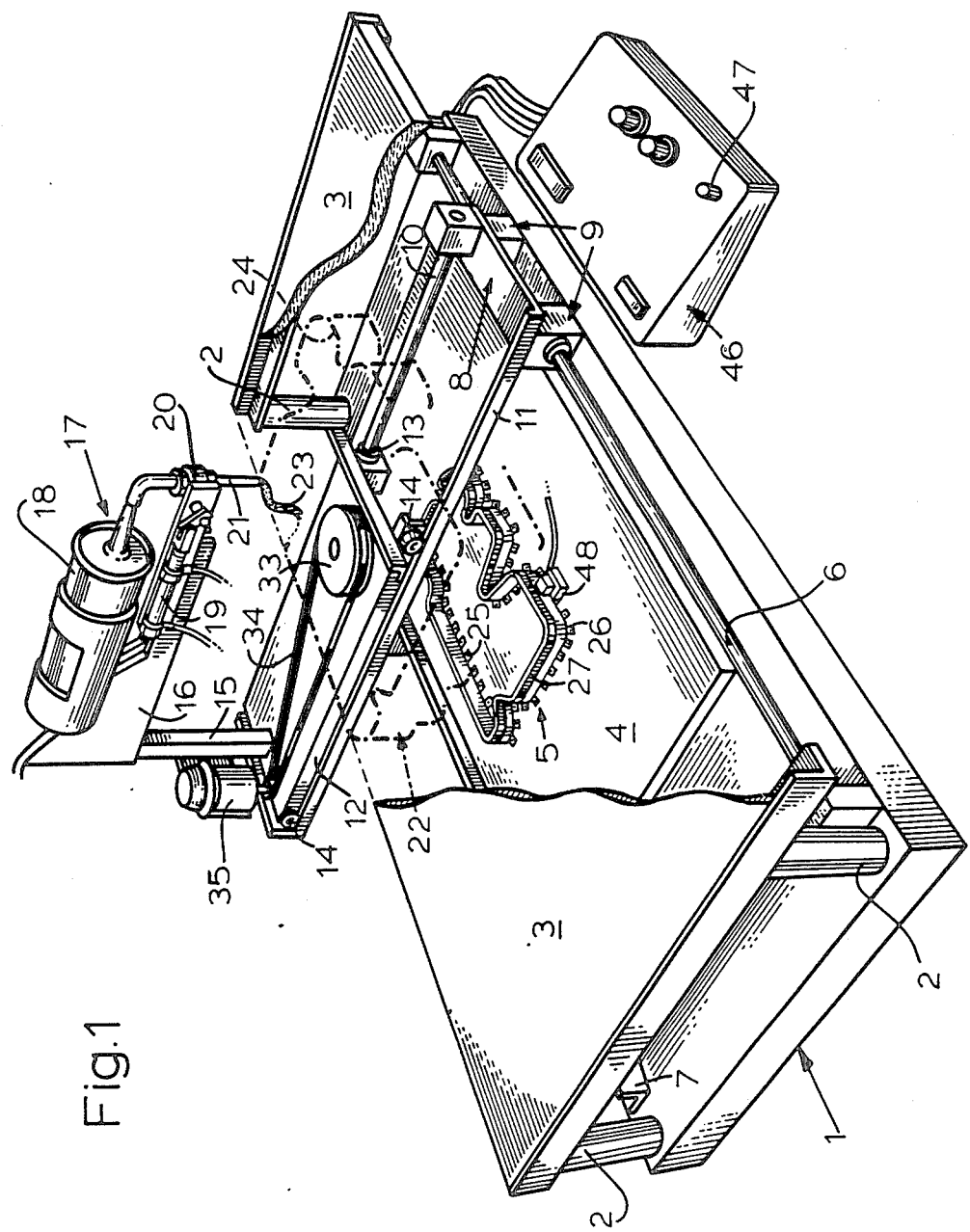

United States Patent [19]

Källberg

[11] Patent Number: 4,694,579
[45] Date of Patent: Sep. 22, 1987

[54] DEVICE FOR GUIDING A TOOL ALONG A CURVE

[76] Inventor: Björn Källberg, Box 6040, S-191 06 Sollentuna, Sweden

[21] Appl. No.: 834,243

[22] PCT Filed: May 22, 1985

[86] PCT No.: PCT/SE85/00214
§ 371 Date: Jan. 22, 1986
§ 102(e) Date: Jan. 22, 1986

[87] PCT Pub. No.: WO85/05310
PCT Pub. Date: Dec. 5, 1985

[30] Foreign Application Priority Data
May 23, 1984 [SE] Sweden ................................ 8402796

[51] Int. Cl.⁴ .............................................. B43L 13/10
[52] U.S. Cl. .................................. 33/23.08; 33/27.12; 266/58

[58] Field of Search ...................... 33/23.1, 23.2, 23.3, 33/23.5, 25.1, 25.2, 25.3, 27.12, 562, 565, 566, 176, 177; 409/125, 130, 97, 101, 103, 110; 266/58, 60, 64, 62, 63

[56] References Cited

U.S. PATENT DOCUMENTS

| 1,646,129 | 10/1927 | Wagner | 266/58 X |
| 2,068,166 | 1/1937 | Dodge | 266/58 X |
| 2,087,678 | 7/1937 | Wagner | 266/58 X |
| 2,904,886 | 9/1959 | Morehead | 33/23.11 |

FOREIGN PATENT DOCUMENTS

| 243816 | 12/1925 | United Kingdom | 266/58 |
| 0759254 | 8/1980 | U.S.S.R. | 266/58 |

Primary Examiner—Harry N. Haroian
Attorney, Agent, or Firm—Erwin S. Teltscher

[57] ABSTRACT

Apparatus to guide a tool along a curved template, has a curve follower connected to the tool, the curve follower includes two rotatable elements, one of which is driven and the other is freely rotatable. The two rotatable members resiliently contact the curve template from either side.

4 Claims, 3 Drawing Figures

DEVICE FOR GUIDING A TOOL ALONG A CURVE

The present invention concerns a device for guiding a tool along a curve, said device comprising a holder for the tool being movable in one plane and being so connected to a curve follower, which is adapted to follow a predetermined guide curve in the same or another plane, that the holder and the tool follow a path corresponding to the path of the curve follower.

A tool of the kind here intended can be e.g. adapted to discharge sealing compound, or, be a cutting torch, a corresponding device then serving for repeatedly distributing sealing compound over the sealing surfaces of identical objects, or, cutting identical sheet metalpieces.

In a known device of the kind initially stated, which serves to apply a string of silicone sealing compound on joint surfaces, the curve follower is a roller, which is freely rotatably journalled in one end of a horizontal arm. The roller engages from underneath into and runs along a slot milled through a plate. Since this slot describes a closed pattern the central part of the plate must be suspended, which is done in the support for the object to be charged with sealing compound. The tool, an extrusion device for the sealing compound, is mounted in the end of a manually operable arm, which horizontally is rigidly connected to the arm just mentioned. The two arms are commonly pivotedly connected to a third arm, such that the roller and the extrusion device are freely movable in one horizontal plane each.

Apart from the evident drawback that a closed guide slot requires suspension of the central part of the plate, i.e., one defining curve of the guide slot, a milled guide slot requires expensive machines and time consuming work to be accomplished. Further, the manual operation of the tool involves—even with the most skilful operator—that the movement along the curve hardly can take place with a constant speed, which in turn results in that the string of sealing compound receives a varying thickness if it is extruded with a continuous flow. This in turn may have devastating consequences, particularly if too much sealing compound is extruded, since sealing compound forced outside sealing surfaces may come loose and stick in e.g. the cooling channels of a combustion enginge.

The present invention has as its object to provide a device of the kind initially stated, which allows the utilization of particularly cheap, simple and easily shapable guide curves, along which the curve follower is movable in an even speed.

This object has been achieved in that the invention has received the characteristics stated in the following claims.

Figure 2:
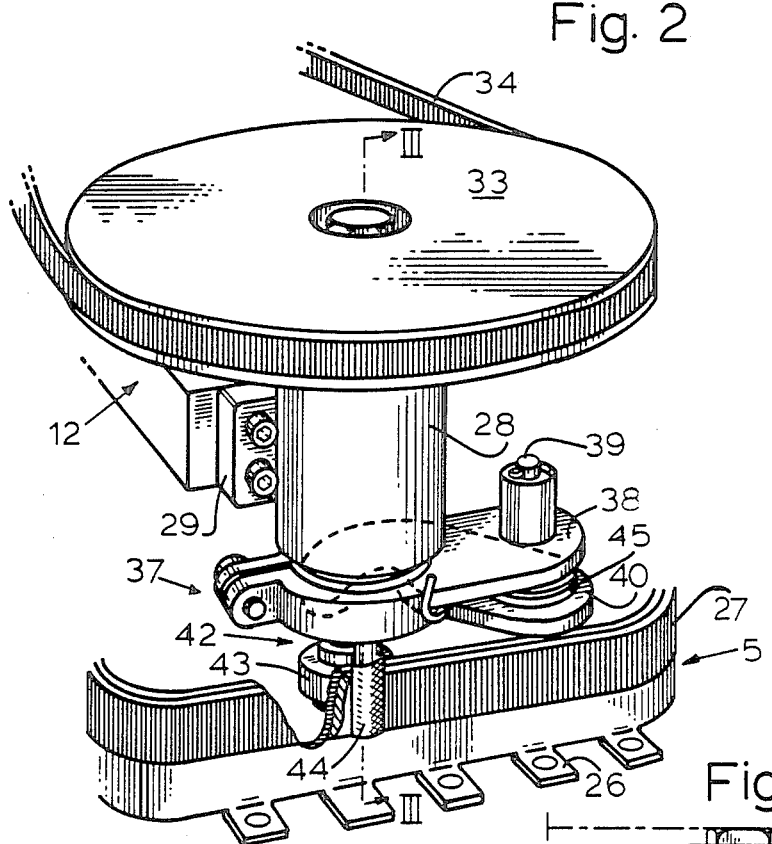
Figure 3:
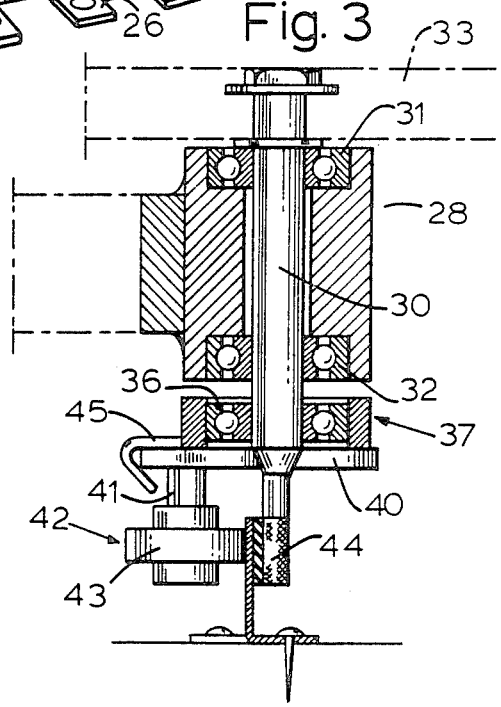

One example embodying the invention will be described below, reference being made to the accompanying drawings, wherein FIG. 1 is a partially broken up perspective view showing a device according to the invention adapted to apply a string of sealing compound along a closed path, FIG. 2 shows at a larger scale and likewise in a perspective view a curve follower and a portion of a guide curve according to the invention, and FIG. 3 shows a section taken along the line III—III of FIG. 2 through the curve follower as well as the guide curve.

Above a plane, rectangular base 1 is mounted, by means of columns 2, a likewise rectangular working plane 3. Upon the base 1 rests a plane plate 4, which by means not shown is attachable to the base. On the plate 4 is mounted a guide curve 5, which will be further described below.

Between the base 1 and the working plane 3 is arranged a coordinate table of a known kind comprising a cylindrical bar 6, which is parallel to and located close to an edge of the base 1. An L-bar 7, against which advantageously abuts one edge of the preferably rectangular plate 4, is mounted parallel to the bar 6 at the opposite edge of the base 1. By means of ball bushings 9 a first carriage 8 is movable along the bar 6. Also the carriage 8 comprises a cylindrical bar 10 and an L-bar 11 parallel thereto, both being perpendicular to the bar 6. By means of rolls not shown, e.g. in the shape of roller bearings, the carriage 8 is supported on the L-bar 7. By means of ball bushings 13 a second carriage 12 is movable along the bar 10 and by means of rolls 14 it rests on the L-bar 11.

By means of a vertical bar 15 and a horizontal, vertically adjustable arm 16 the carriage 12 carries above the working plane 3 an extrusion apparatus 17 comprising a pressure operated tube 18 for sealing compound and a likewise, by means of a cylinder 19, pressure operated valve 20, which is mounted between the tube 18 and a nozzle 21.

By means of the arrangement now described the nozzle 21 is movable in a horizontal plane, which by varying vertical adjustment of the arm 16 can vary between the working plane 3 and an arbitrary hight thereabove. In the example shown, an object 22, e.g. a valve cap for a combustion engine, is indicated by dash-dotted lines lying on the working plane 3. The nozzle 21 is adjusted to apply a string 23 of sealing compound on the sealing surface 24 of the object 22, which is located in a plane above the working plane 3.

In order to apply a string of sealing compound along a predetermined curve, the guide curve 5 mounted on the plate 4 is shaped in an exactly corresponding manner. The guide curve comprises a flexible strip of e.g. sheet metal, which is adapted to be attached protruding from a base. In the example shown (FIGS. 2 and 3) lugs 25, 26 are cut in one edge of the strip and are bent at a right angle to either sides of the main portion of the strip, so that the strip can stand on the lugs and easily be attached to a base, e.g. the plate 4, which advantageously can be made of wood or a material based on wood by means of nailing or screwing. Bending of the strip to the curve shape desired can very easily take place by hand. One of the surfaces of the strip is advantageously provided with a glued or vulcanized band 27 of frictionincreasing material, such as rubber.

The cam follower according to the invention, which is particularly shown in FIGS. 2 and 3, includes a cylindrical housing 28, which is attached to a part of the carriage 12 by means of a welded attachment flange 29. Centrally through the housing 28 extends a shaft 30, which is journalled in ball bearings 31 and 32 in both ends of the housing. At the upper end of the shaft is unrotatably mounted a wheel 33, which, by means of a drive belt 34, is drivingly connected to an electric motor 35 (FIG. 1). Suitably the drive belt 34 is a toothed belt, the wheel 33 and the drive wheel of the motor 35 then being provided with corresponding teeth. On the lower end of the shaft 30 extending from the housing 28 is pressed the inner race of a ball bearing 36, the outer race of which by means of a clamping joint 37 carries a laterally extending first arm 38. At the free end of the arm 38 is rotatably journalled a vertical shaft 39, which in turn carries a second arm 40, which in its free end is provided with a depending stationary stud 41. On this stud is mounted the inner race of a roller bearing 42. The arm 40 has such length that the outer race 43 of bearing 42 can touch the lower end 44 of shaft 30. A spring 45 mounted between the arms 38 and 40 presses the outer race 43 towards the shaft end 44. The outer race 43, thus, serves ascounter press roll for the shaft end 44.

The cam follower now described is adapted to grip, with the outer race 43 and the shaft end 44, the vertical portion of the guide curve 5 described above. For that purpose, the shaft end 44 is advantageously knurled for cooperation with the band 27 of the guide curve 5.

Due to the fact that the arms 38 and 40, which carry the counter press roll 43, are feely rotatable relative to the shaft 30, and, due to the fact that the roller 43 is constantly urged towards the shaft end 44, it is achieved that the centers of the roll 43 and the shaft end 44 always will tend to be located on one and the same normal to the guide curve 5, or, in other words, that the counter press roll 43 always tends to be situated opposite to the driven and driving shaft end 44, i.e., where it with the best function pulls the shaft end 44 to operative guide and drive engagement with the guide curve 5.

By the invention has been achieved a very simple, cheap and extremely well functioning device. It is realized that many modifications can be made within the scope of the inventive concept. Thus, the drive motor may e.g. be mounted directly on the shaft 30. Likewise, the swingability of the counter press roll may be different, e.g. about a horizontal axis. Of course, the coordinate table may be replaced by another arrangement, e.g. similar to the one initially described having interpivoted arms.

For controlling the motor 35 and the pressure feeding of the extrusion apparatus 17 there is a control panel 46 having a.o. a starting button 47. A micro switch 48, which is mounted close to the guide curve 5, stops the motor after a completed round about the guide curve.

In certain applications of the invention, e.g. where the tool is a cutting torch, it may be suitable that the tool and the guide curve are located in substantially the same plane with the tool laterally displaced outside the guide curve.

I claim:

1. A device for guiding a tool (17) along a curve (24), said device comprising a holder (16) for the tool to be movable in one plane, and being so connected to a curve follower, which is adapted to follow a predetermined guide curve (5) in the same or another plane, that the holder (16) and the tool (17) follow a path corresponding to the path of the curve follower, said curve follower including a driven rotatable means (44) rigidly jointed to the holder (16) for the tool, and a freely rotatable means (43), both said rotatable means (43, 44) being movable towards each other so as to contact said guide curve (5) from either side thereof, a first arm (38) being mounted to be freely rotatable about the driven rotatable means (43) and carrying a second arm (40) journalled for swinging motion relative to said first arm (38), said second arm (40) carrying said freely rotatable means (43), and spring means (45) acting between said first arm (38) and said second arm (40) to urge said freely rotatable means (43) towards said driven rotatable means (44).

2. The device according to claim 1, wherein said driven rotatable means (44) includes a shaft having mounted thereon an inner race of a roller bearing (36), said first arm (38) being carried by an outer race of said roller bearing (36).

3. The device according to claim 2, wherein said first arm (38) is mounted on said outer race of said roller bearing (36) by means of a clamping joint (37).

4. The device according to claim 1, wherein said freely rotatable means (43) comprises an outer race of a rolling bearing (42).

* * * * *